May 16, 1944.  E. S. HEBELER  2,349,229

METHOD OF AND APPARATUS FOR PRODUCING PULSATING CURRENT

Filed Feb. 16, 1942

INVENTOR.
EDWARD S. HEBELER
BY
ATTORNEYS.

Patented May 16, 1944

2,349,229

UNITED STATES PATENT OFFICE 2,349,229

METHOD OF AND APPARATUS FOR PRODUCING PULSATING CURRENT

Edward S. Hebeler, Williamsville, N. Y., assignor, by mesne assignments, to Unit Rays, Inc., Cleveland, Ohio, a corporation of Ohio Application February 16, 1942, Serial No. 431,050

2 Claims. (Cl. 171—252)

This invention relates to an apparatus for and method of producing a pulsating current suitable for welding by electricity.

It is the general purpose and object of the invention herein set forth to generate a pulsating current suitable for electric arc welding by means of a specially constructed direct current generator, without the necessity for recourse to any apparatus or devices auxiliary thereto, thereby to effect a material saving in the cost of apparatus necessary for generating such a current as compared with the cost of creating the same by means of the apparatus employed for such purpose in my Patent No. 2,139,160.

Figure 1:
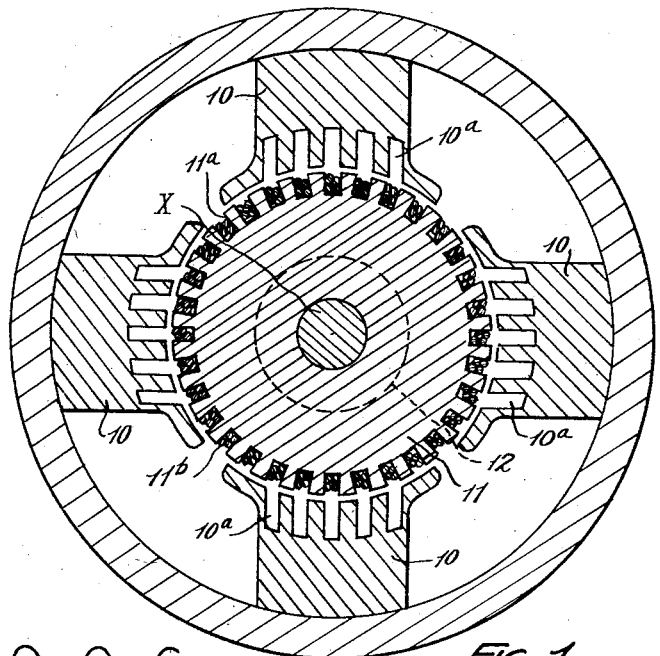
Figure 2:
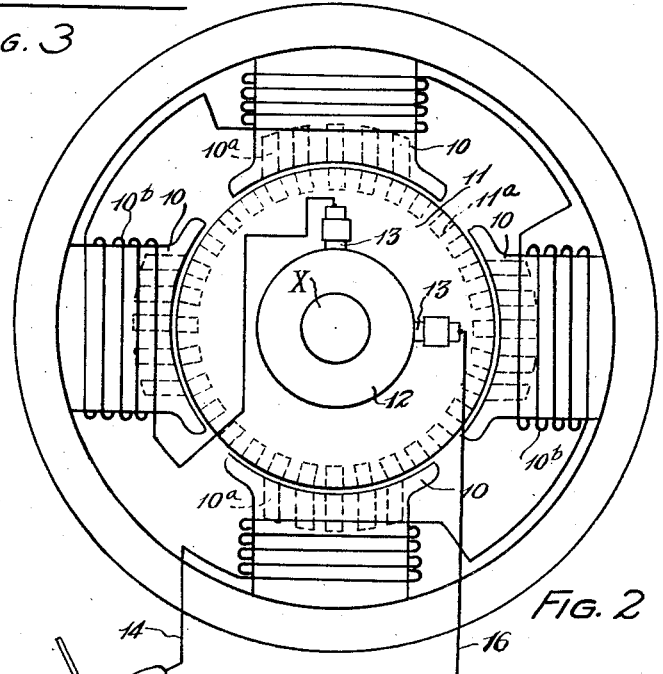

I realize the foregoing purpose and object in and through the construction and arrangement of parts shown in the drawing hereof, wherein Fig. 1 is a sectional diagrammatic view of my preferred apparatus and the manner in which it is operated for the purpose of effecting electric arc welding; Fig. 2 is a detail in end elevation of the pole pieces and armature core of the generator forming part of the apparatus shown in Fig. 1; and Fig. 3 a view representing the kind of current wave produced by an apparatus of the type shown in Figs. 1 and 2.

Describing by reference characters the parts shown in the drawing, 10 denotes the pole pieces, 11 the armature and 12 the commutator of a four-pole direct current generator, 13 the commutator brushes, 14 a conductor leading from one of said brushes through the field coils $10^b$ to the welding electrode 15, and 16 a conductor leading from the other commutator brush to the work piece 17.

In Fig. 2, I have shown in detail the cooperating construction of the pole pieces and the arrangement of the armature conductors whereby a pulsating current may be generated which is suitable for use with the welding electrode 15. From this view, it will be seen that each of the pole pieces is provided with a plurality of slots $10^a$ extending thereinto from the face thereof which is presented toward the armature, these slots being preferably parallel with one another throughout their depth and also parallel with the armature shaft X and also being equidistantly spaced. As illustrated, each pole piece is shown as provided with a series of five such slots (although the number may, of course, be varied); and a radial plane extending from the armature shaft X will pass midway between the sides of the centrally arranged slot of each of the series thereof.

The armature is of the drum type and is provided with a plurality of slots $11^a$ extending radially inwardly from the outer surface thereof, these slots being equidistantly spaced apart and being so arranged that, taking the axis of the shaft X as the center, the angular distance between the centers of any adjacent pair of said slots is equal to the angular distance between the centers of the outer ends of any adjacent pair of the slots in the pole pieces.

$11^b$ denotes conductors, or groups of conductors, which are located within the slots $11^a$, the conductors or groups of conductors in different slots being connected in series, thereby to constitute a series-wound armature, and also being connected to the commutator 12 in a well known manner. The armature slots and the slots in the pole pieces are so arranged that, during each revolution of the armature, the entire active portion of the conductor or group of conductors in each armature slot will be caused to register successively with each of the slots in the pole pieces and simultaneously with the registration of other conductors or groups of conductors in other armature slots with the other slots of the pole pieces. As will be understood, when each conductor or group of conductors in the same armature slot registers with a slot in a pole piece, the amplitude of the current induced therein will be weakened, but will be progressively increased to a predetermined maximum and progressively decreased from such predetermined maximum to a predetermined minimum during the time wherein the conductor or group of conductors is being moved from registration with one slot of a pole piece into registration with the next adjacent slot thereof.

Due to the construction of the generator and the operation thereof as thus described, a pulsating current can be produced which will be suitable for arc welding purposes and which current can be delivered to the welding electrode 15.

By varying the number of the slots in the pole pieces or by varying the depth of said slots, the amplitude of the pulsations can be varied; and by varying the number of slots in the armature and, consequently, varying the number of conductors or groups of conductors, the frequency of the pulsations can be varied. If we assume, for instance, that the armature is provided with thirty-two slots, with a corresponding number of conductors, the armature winding will be subjected to thirty-two current changes or pulsations during each revolution of the armature. Should the armature be rotated at a speed of 1000 R. P. M., this would result in 32×1000, or 32,000 current changes or pulsations per minute; or 533⅓ current changes or pulsations per second.

Figure 3:
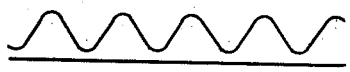

In a pulsating current which is produced by an apparatus constructed as shown and described herein, there is no zero current period, the current being unidirectional. The amplitude of the wave from maximum to minimum current depends upon several factors, but principally on the depth of the slots in the pole pieces. In Fig. 3 there is shown a wave form curve which should approximately result from the operation of an apparatus such as shown and described herein.

From the foregoing, it will be apparent that I am able to produce a pulsating current suitable for electric arc welding purposes in a particularly simple, economical, and efficient manner, and by means of a correspondingly simple and economical construction of current-generating apparatus.

Since they form no part of the invention sought to be covered by patent, I have not shown nor described such customary features of the type of generator shown herein as a shunt field winding, commutating poles, or other usual auxiliary parts.

Having thus described my invention, what I claim is:

1. A direct current generator for producing a pulsating current suitable for arc welding purposes, said generator consisting of a plurality of pole pieces, an armature rotatably mounted in the space between the said pole pieces, and a shaft for said armature, the said armature being provided with slots extending the full length thereof, the longitudinal center of each of said slots being located in a radial plane including the axis of said shaft, and one or more electrical conductors mounted in each of said slots and extending the full length thereof, the said pole pieces each having slots extending thereinto from the faces thereof and being so spaced and arranged that they register successively and simultaneously with the outer ends of the armature slots during the rotation of the armature.

2. In the direct current generator set forth in claim 1, the said generator consisting of at least four pole pieces.

EDWARD S. HEBELER.